United States Patent [19]
Steinhart et al.

[11] Patent Number: 5,506,460
[45] Date of Patent: Apr. 9, 1996

[54] PRECISION DRIVE SYSTEM FOR INDEPENDENTLY DRIVEN COAXIAL SHAFTS, PARTICULARLY TO MAKE COILED ELECTRIC LAMP FILAMENTS

[75] Inventors: Winfried Steinhart, Friedberg-Haberskirch; Ulrich Goeppert, Friedberg, both of Germany

[73] Assignee: Patent-Treuhand-Gesellschaft F. Elektrische Gluehlampen mbH, Munich, Germany

[21] Appl. No.: 148,585

[22] Filed: Nov. 8, 1993

[30] Foreign Application Priority Data

Jan. 14, 1993 [DE] Germany .............................. 9300410 U

[51] Int. Cl.$^6$ .............................. H02K 16/00; H02K 7/20; D01H 13/00
[52] U.S. Cl. ........................ 310/112; 310/67 R; 310/114; 57/100
[58] Field of Search .................................. 310/67 R, 112, 310/114; 57/17, 18, 100, 264; 140/149

[56] References Cited

U.S. PATENT DOCUMENTS

| | | | |
|---|---|---|---|
| 1,983,896 | 12/1934 | Bottcher | 310/112 |
| 3,152,960 | 10/1964 | Alfred | 310/112 |
| 3,968,390 | 7/1976 | Yasuda et al. | 310/156 |
| 4,521,707 | 6/1985 | Baker | 310/112 |
| 4,654,577 | 3/1987 | Howard | 310/112 |
| 4,749,898 | 6/1988 | Suzuki et al. | 310/114 |
| 5,111,647 | 5/1992 | Gabalda | 57/100 |
| 5,231,819 | 8/1993 | Stahlecker et al. | 57/100 |
| 5,274,286 | 12/1993 | Yamamura | 310/67 R |

FOREIGN PATENT DOCUMENTS

| | | |
|---|---|---|
| 1966274 | 8/1967 | Germany . |
| 2350399C2 | 4/1975 | Germany . |
| 3-82355 | 4/1991 | Japan . |
| 1423643 | 9/1988 | U.S.S.R. ................................. 57/100 |
| 1478475 | 6/1977 | United Kingdom . |

Primary Examiner—Clayton E. LaBalle
Attorney, Agent, or Firm—Frishauf, Holtz, Goodman, Langer & Chick

[57] ABSTRACT

To reduce the moment of inertia and eliminate variations in speed of two coaxial, driven shafts, in which an outer shaft (8) surrounds a central spindle (2), which is particularly important for coiling filament material used in electric lamps, the motors are formed as essentially identical permanent-magnet rotor motors, in which permanent magnets are securely affixed to the central spindle and the surrounding shaft (8), respectively, the stators of which are retained in a common housing (6). The outer shaft carries a supply reel (3) for the filament to be coiled, whereas the inner shaft carries a winding head (7) and a reciprocating deflection roller arrangement for winding the filaments. A typical speed of operation is 1.5 seconds to wind a filament and 0.2 second pause between sequential filaments. Such filaments can be used, for example, in a general-service 60 W lamp. Preferably, the shafts are so arranged that the radial dimension of the inner diameters of the permanent-magnet rotors on the spindle (2) as well as on the surrounding hollow shaft (8) which carries the filament supply reel (3) are the same, thus at least approximately equalizing an already low rotary moment of inertia of the two shafts and motors.

14 Claims, 1 Drawing Sheet

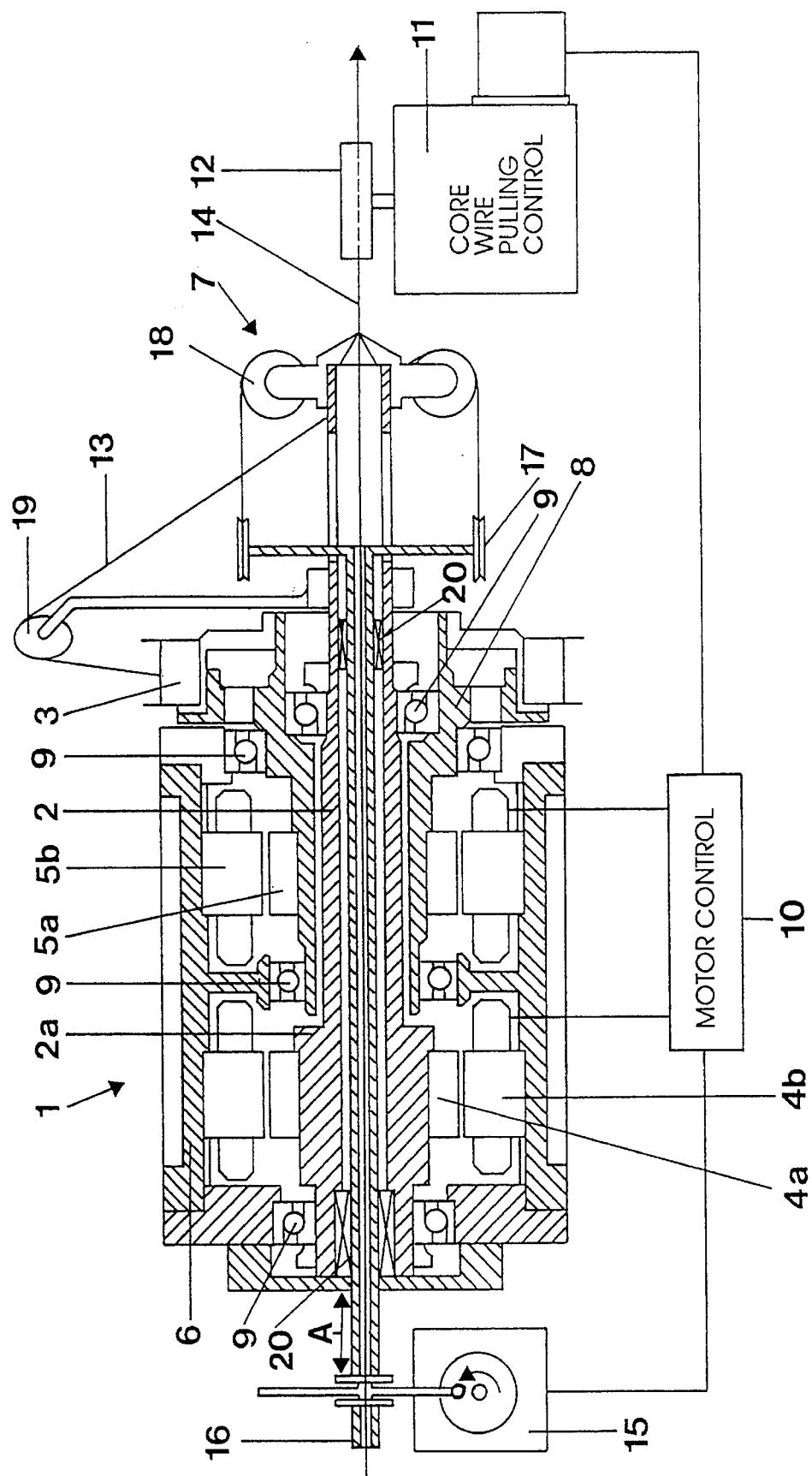

PRECISION DRIVE SYSTEM FOR INDEPENDENTLY DRIVEN COAXIAL SHAFTS, PARTICULARLY TO MAKE COILED ELECTRIC LAMP FILAMENTS

REFERENCE TO RELATED DISCLOSURE

German Patent 23 50 399, Blumberg et al, published Apr. 17, 1975, to which British 1.478.475 of Jun. 29, 1977, corresponds.

FIELD OF THE INVENTION

The present invention relates to an electric drive for apparatus which has at least two coaxially located shafts, in which an innermost, solid shaft forms a spindle, and is surrounded by one or more hollow outer shafts, all coaxially located.

BACKGROUND

A drive for two shafts which are coaxially positioned, and particularly intended to make coiled filament windings for electrical lamps, is well known and used in the industry. Such a drive is illustrated in German Patent 23 50 399, Blumberg et al, to which British 1.478.475 corresponds. The drive is used as a component in a winding machine to make coiled filaments for electric lamps. It uses two separate electric motors which are connected by belt drives to, respectively, the winding spindle which carries the winding head, and a carrier sleeve, coaxially located with respect to the winding spindle, and carrying a supply reel for the filament material. This filament material may be an uncoiled wire, or already a coiled wire. Electric lamps, typically, use tungsten wire for filaments.

The drive, as customarily known, is satisfactory but the power transmission from the electric motors to the shafts to be driven, namely the winding spindle and the carrier sleeve for the supply reel by means of belts has disadvantages. As the speed is increased, the belts have a tendency to vibrate or oscillate, which interferes with precise speed and operating control. Such oscillations lead to consequential non-uniformities in the wound filaments, which detracts from the quality of the filament obtained.

THE INVENTION

It is an object to provide a drive for an apparatus which requires high precision in uniformity of movement, rapid acceleration and deceleration, minimum inertia, and which permits speed control of the respective driven shafts, independently of each other. Additionally, the apparatus should be compact and capable of operating at speeds higher than heretofore possible.

Briefly, the precision drive has two similar electric motors in which the rotors of the motors are directly secured or fastened on the respective shafts, that is, one of the rotors is on a central spindle, another rotor is on the surrounding sleeve and, for other uses, where further shafts are to be driven, they can be placed on additional concentrically located hollow shafts.

The direct drive of the spindle shaft or shafts permits elimination of intervening drive elements which are subject to spurious oscillations. It is further possible to mount the electric motors in a spatially compact arrangement, for example and preferably, in a common housing.

Preferably, the motors used are brushless motors using permanent magnet rotors. Permanent magnets can be secured to the shafts, that is, the inner spindle and one or more outer surrounding shafts, by adhesives. The stators for the respective motors can be placed in radial alignment with the rotors, all within a single common housing.

The drive is particularly suitable for a winding head to form a light generating element in form of a coiled filament. The carrier sleeve can be used to support a supply reel for the light generating element, that is, a filament wire or a coiled filament, so that the machine, then, will form the final coiled or coiled-coil filament for electric lamps.

The drive in accordance with the present invention has the advantage that the moment of inertia is low, thus permitting high acceleration and deceleration, which leads to an increase in production of the winding machine. This increase can double production with respect to prior art machines. The machine can operate at such speeds that, to make a double-coiled filament for a general service 60 W lamp, a winding time of 1.5 seconds with a pause between sequential winding cycles of 0.2 second is possible. In the pause time, a single-coiled wire portion is formed, used to attach the filament on electrode support mounts.

To reduce the moment of inertia and eliminate variations in speed of two coaxial, driven shafts, in which an outer shaft surrounds a central spindle, which is particularly important for coiling filament material used in electric lamps, the motors are formed as permanent-magnet rotor motors, in which permanent magnets are securely affixed to the central spindle and the surrounding shaft (or shafts), respectively, the stators of which are retained in a common housing. The outer shaft carries a supply reel for the filament to be coiled, whereas the inner shaft carries a winding head and a reciprocating deflection roller arrangement for winding the filaments. A typical speed of operation is 1.5 seconds to wind a filament and 0.2 second pause between sequential filaments. Such filaments can be used, for example, in general-service 60 W lamps. Preferably, the shafts are so arranged that the radial dimension of the inner diameters of the permanent-magnet rotors on the spindle as well as on the surrounding hollow shaft which carries the filament supply reel are the same, thus at least approximately equalizing an already low rotary moment of inertia of the two shafts and motors.

DRAWING

The single figure is a highly schematic cross-sectional view through the drive, utilizing as an example a filament winding machine well known in the industry.

DETAILED DESCRIPTION OF A PREFERRED EMBODIMENT

The drive apparatus 1, shown as a filament winding machine, is used to drive a winding spindle 2, to coil the light generating element, for example a filament or a coiled filament 13 retained on a supply reel 3. The supply reel 3 is seated on an outer shaft 8, which is hollow and surrounds the spindle 2. The spindle 2 is also hollow to permit feeding a core wire 14 therethrough.

In accordance with a feature of the invention, two brushless electric motors drive, respectively, the spindle 2 and the outer shaft 8. The brushless electric motors have rotors 4a, 5a, which are formed as permanent magnet rotors and located, axially staggered but closely adjacent each other, along the winding axis. The motors are located in a common housing 6, coaxial with the spindle 2. The rotor 4a of the first electric motor is directly secured to the outer surface of the spindle 2. The spindle 2 carries the winding head 7, which is shown only schematically since it is of well known and standard construction and, as such, does not form part of the present invention. The rotor 4a is secured to the spindle 2 by an adhesive. The stator 4b of the first motor is secured to the inner wall of the housing 6 in any suitable manner, for example also by an adhesive, a press fit with rotational restraining elements such as grooves, knurls and the like, or otherwise, as well known in the motor field. The rotor 5a of the second electric motor is directly secured on the outer surface of the outer shaft 8, which forms a carrier sleeve for the reel 3 carrying the light generating material. The rotor 5a is adhered to the sleeve 8. The stator 5b of the second motor is secured to the inner wall of the housing 6, for example similar to the attachment of the rotor 4b. The winding spindle 2 and the outer shaft or sleeve 8 are coaxially located, so that the sleeve 8 surrounds the winding spindle 2. The ends of the winding spindle 2 extend beyond the ends of the carrier sleeve 8. One end of the winding spindle 2 carries the winding or coiling head 7. The other end of the spindle 2 is radially enlarged to form a section 2a. The outer diameter of the section 2a, on which the rotor 4a is adhered, is the same as the outer diameter of the carrier sleeve 8 on which the rotor 5a of the second motor is secured. Thus, the inner diameters of the rotors 4a and 5a will be in axial alignment and the motors will be similar and have similar moments of inertia.

The spindle 2 and the carrier sleeve or outer shaft 8 are relatively movably retained in the housing 6 by a plurality of precision bearings 9.

In accordance with a feature of the invention, the moment of inertia of the spindle 2 and all elements rotating therewith, for example the rotor of the first motor 4a, is at least approximately the same as that of the outer shaft 8 including all parts rotating therewith, for example the rotor 5a of the second motor. The motors which drive the spindle 2 and the carrier sleeve 8 are essentially identical permanent magnet rotor motors having an electric power rating of about 1500 watts each. The two motors are controlled by an electronic motor control unit 10 which permits precise control of the speed of the spindle 2 as well as of the carrier sleeve or outer shaft 8. The electronic control 10 further controls a drive 11 for a pulling element 12 coupled to the mandrel or core wire 14, which extends through the hollow spindle 2. The motor control 10 additionally controls a tension generator 15 for a reciprocating pull rod 16. The pull rod 16 is longitudinally movable, see double arrow A, in the axis of the winding machine with respect to the winding head 7. It rotates with the same circumferential speed as the spindle 2. The end of the pull rod 16 adjacent the winding head carries two deflection rollers 17 which, in combination with four deflection rollers 18, secured to the winding head, permit fine adjustment of the winding tension of the light emitting element spooled off the reel 3, and guided to the winding head 7 over another deflection roller 19.

Operation:

For winding, the electric motors are controlled by the electronic control unit 10 in such a manner that the carrier sleeve 8 rotates with slightly higher speed than the spindle 2, causing the light emitting element 13 to be spooled off the supply reel 3, in accordance with design and coiling requirements. The control unit 10 additionally controls concurrent, relatively adjusted movement of the pulling element 12, the reciprocating rod 16, the winding head 7, as well as the rotation of the supply reel 3.

The system is highly flexible and, because of the matched moments of inertia, permits high acceleration and deceleration. Thus, to wind a filament for a general service 60 W lamp, 1.5 seconds are needed, with a pause between sequential winding cycles or steps of only about 0.2 second. The supply reel 3 and the pulling element 12 move during this time.

The electric motors are highly compact and, within the housing 6, require a space of only about 16×11×11 cm, that is, only about 1936 cm$^3$.

Various changes and modifications may be made. For example, other electric motors than brushless permanent magnet rotor motors may be used; asynchronous motors, likewise, can be used for the drive in accordance with the present invention. If, for specific applications, more than one outer shaft should be placed on an inner spindle, it is readily possible to do so; preferably, the intermediate shaft has a radially enlarged portion so that the outer diameters of the shafts, in the region where the rotors are placed, are in axial alignment; the moments of inertia of the respective motors, and the associated rotating parts, will then be at least approximately similar. The motors should be placed, axially, as close together as possible to reduce any tipping torques.

A suitable and preferred adhesive for the rotor magnet is LOCTITE (™) No. 325 and LOCTITE (™) Activator No. 707.

We claim:

1. The combination of a winding machine for producing coiled filaments for electric lamps with a precision drive for said winding machine, said winding machine having two coaxially positioned shafts (2, 8), said shafts defining a hollow inner spindle (2) and a surrounding hollow outer shaft (8);

a filament supply reel (3) secured to one (8) of said shafts;

a winding head (7) secured to the other (2) of said shafts;

ball bearings (9), said ball bearings having bearing races secured, respectively, to said inner spindle (2) and said outer shaft (8); and wherein said precision drive (1) comprises two essentially identical electric motors having permanent magnetic rotors (4a, 5a), one (4a) of the rotors being secured on said hollow inner spindle (2) and the other (5a) of said rotors being secured on said hollow outer shaft (8);

an electronic control unit (10) coupled to the respective motors and controlling the speed of the motors, and hence the speed of the shafts (2, 8) to which they are coupled; and wherein the rotary moment of inertia of the inner spindle (2), the rotor (4a) secured thereto and the bearing race secured thereon is at least approximately the same as the rotary moment of inertia of the outer shaft (8), the rotor (5a) secured thereto and the bearing race secured thereon.

2. The combination of claim 1, wherein the motors are brushless electric motors.

3. The combination of claim 1, wherein each of the permanent magnet rotors (4a, 5a) is adhesively secured to the respective shaft (2, 8).

4. The combination of claim 1, further including a housing (6) which is common for all said motors, said motors being positioned axially staggered, and adjacent each other within said housing (6).

5. The combination of claim 4, wherein the hollow outer shaft terminates, axially, in advance of the position of the rotor (4a) secured to the inner spindle; and the outer diameters of said inner spindle, and the hollow outer shaft, at the position where the rotors (4a, 5a) are secured to the respective shaft, are essentially identical.

6. The combination of claim 1, wherein the hollow outer shaft terminates, axially, in advance of the position of the rotor (4a) secured to the inner spindle; and said inner spindle (2) is formed with a radially enlarged region having an outer diameter similar to the outer diameter of the hollow outer shaft (8), said one rotor (4a), secured to said spindle, being positioned on said radially enlarged region, whereby the inner diameters of the rotors (4a, 5a) of said motors are essentially identical.

7. The combination of claim 1, wherein said filament supply reel (3) is secured to said hollow outer shaft (8); and said winding head (7) is secured to said hollow inner spindle (2).

8. The combination of claim 2, wherein said filament supply reel (3) is secured to said hollow outer shaft (8); and said winding head (7) is secured to said hollow inner spindle (2).

9. The combination of claim 3, wherein said filament supply reel (3) is secured to said hollow outer shaft (8); and said winding head (7) is secured to said hollow inner spindle (2).

10. The combination of claim 4, wherein said filament supply reel (3) is secured to said hollow outer shaft (8); and said winding head (7) is secured to said hollow inner spindle (2).

11. The combination of claim 5, wherein said filament supply reel (3) is secured to said hollow outer shaft (8); and said winding head (7) is secured to said hollow inner spindle (2).

12. The combination of claim 5, wherein the motors are brushless electric motors.

13. The combination of claim 5, wherein each of the permanent magnet rotors (4a, 5a) is adhesively secured to the respective shaft (2, 8).

14. The combination of claim 5, further including a housing (6) which is common for all said motors, said motors being positioned axially staggered, and adjacent each other within said housing (6).

* * * * *